US012770505B2

(12) United States Patent
Eilertsen

(10) Patent No.: US 12,770,505 B2
(45) Date of Patent: Oct. 20, 2026

(54) ROADSIDE UNIT SYSTEM AND METHOD THEREOF

(71) Applicant: Roger Andre Eilertsen, Askim (NO)

(72) Inventor: Roger Andre Eilertsen, Askim (NO)

( * ) Notice: Subject to any disclaimer, the term of this patent is extended or adjusted under 35 U.S.C. 154(b) by 0 days.

(21) Appl. No.: 18/655,055

(22) Filed: May 3, 2024

(65) Prior Publication Data

US 2024/0346923 A1 Oct. 17, 2024

Related U.S. Application Data

(63) Continuation-in-part of application No. 17/254,124, filed as application No. PCT/NO2019/000020 on Jun. 14, 2019, now abandoned.

(30) Foreign Application Priority Data

Jun. 18, 2018 (NO) .................................... 20180845

(51) Int. Cl.

*G08G 1/01* (2006.01)
*G08G 1/0967* (2006.01)
*H04W 4/029* (2018.01)
*H04W 4/44* (2018.01)

(52) U.S. Cl.

CPC ......... *G08G 1/0141* (2013.01); *G08G 1/0116* (2013.01); *G08G 1/0133* (2013.01); *G08G 1/0145* (2013.01); *H04W 4/029* (2018.02); *H04W 4/44* (2018.02)

(58) Field of Classification Search

CPC .. G08G 1/0141; G08G 1/0116; G08G 1/0133; G08G 1/0145; G08G 1/0112; G08G 1/0129; G08G 1/096716; G08G 1/096741; G08G 1/096775; H04W 4/029; H04W 4/44

USPC .......................................................... 701/118

See application file for complete search history.

(56) References Cited

U.S. PATENT DOCUMENTS 9,651,391 B1 * 5/2017 Hayes ................ G06Q 30/0255
2002/0040270 A1 * 4/2002 Kwak .............. G08G 1/096775 701/532
2002/0042070 A1 4/2002 Kwak et al.
2008/0094250 A1 4/2008 Myr (Continued)

FOREIGN PATENT DOCUMENTS

JP 2018081504 A 5/2018

OTHER PUBLICATIONS

Rashidi, M., et al., "Placement of Road Side Units for Floating Car Data Collection in Highway Scenario," Ultra Modern Telecommunications and Control Systems and Workshops, 4th International Congress, Oct. 3, 2012.

(Continued)

*Primary Examiner* — Hossam M Abd El Latif

(74) *Attorney, Agent, or Firm* — Morse, Barnes-Brown & Pendleton, P.C.; Sean D. Detweiler, Esq.

(57) ABSTRACT

A roadside unit and client system thereof provide a geographically segmented communication system between client systems associated with users of the system. The communication is based on allocating visual symbols representing Roadside units in a computer-coded map served by at least one roadside server, wherein the client system is configured to communicate with a specific roadside unit when the client system is approaching the geographical position allocated to a specific Roadside unit.

15 Claims, 4 Drawing Sheets

(56) References Cited

U.S. PATENT DOCUMENTS

| | | | | |
|---|---|---|---|---|
| 2008/0095163 | A1 | 4/2008 | Chen et al. | |
| 2010/0261428 | A1* | 10/2010 | Goto | G08G 1/096758 455/41.2 |
| 2013/0076538 | A1* | 3/2013 | Uno | G08G 1/096783 340/905 |
| 2014/0214485 | A1* | 7/2014 | Wilson | G06Q 10/10 705/7.29 |
| 2015/0168169 | A1 | 6/2015 | Caceres et al. | |
| 2015/0243165 | A1* | 8/2015 | Elsheemy | G08G 1/096775 340/906 |
| 2017/0129496 | A1* | 5/2017 | Li | B60W 50/0097 |
| 2017/0213461 | A1 | 7/2017 | Murray et al. | |
| 2017/0221366 | A1 | 8/2017 | An et al. | |
| 2017/0371349 | A1* | 12/2017 | Kim | G08G 1/096775 |
| 2017/0372608 | A1* | 12/2017 | Sugimoto | G08G 1/0145 |
| 2019/0356569 | A1* | 11/2019 | Kawauchi | G08G 1/096775 |
| 2021/0074148 | A1* | 3/2021 | Kozaki | G08G 1/056 |
| 2021/0209937 | A1 | 7/2021 | Eilertsen | |

OTHER PUBLICATIONS

International Search Report, International Application No. PCT/NO2019/000020, Date Mailed: Jan. 21, 2020.

Non-Final Office Action in U.S. Appl. No. 17/254,124, dated Nov. 7, 2023.

* cited by examiner

ROADSIDE UNIT SYSTEM AND METHOD THEREOF

RELATED APPLICATIONS

This application is a continuation-in-part of U.S. application Ser. No. 17/254,124, filed Dec. 18, 2020, which is a U.S. national stage application of PCT/NO2019/000020, filed Jun. 14, 2019, which claims priority to Norway Application No. 20180845 filed Jun. 18, 2018, all of which are expressly and entirely incorporated herein by reference.

FIELD OF THE INVENTION

The present invention is related to a Roadside unit and a client system thereof, and especially to a Roadside unit in communication with a Roadside server, wherein a client system associated with users of the system is configured to communicate with the Roadside server via respective Roadside units.

BACKGROUND OF THE INVENTION

Modern cars are changing their appearance from petrol driven speed monsters to electric and environmentally friendly computer driven machines. Many modern cars need software updates from time to time provided over the Internet instead of changing oil from time to time at workshops. In a sense, many modern cars are computers equipped with wheels and an electric motor.

Despite the "modernity" of new cars, one problem remains despite the new technology, and that is the number of cars on the roads.

Cities has evolved with an infrastructure with constraints inherited from city development from as far back in time as the antique. Modern city planning and modernization has improved the situation. However, the main traffic problem due to huge number of cars is of course congestions of cars on the roads that may block traffic for hours.

Traffic flow problems is an area of interest in mathematical disciplines like queue theory and flow theory.

Google map installed in a computer device has the capability of receiving GPS (Global Positioning System) data updates sent from GPS transceivers in cars to a server maintaining maps being viewed in an Internet browser in the computer device. Based on the received data. Google map can provide visual indications in maps of respective traffic levels on roads helping drivers to select better routs outside areas with traffic congestion.

The Internet as a communication infrastructure provides a possibility to communicate with cars from traffic control centers having an overview of the traffic situation in a city for example. Guidance and advice related to traffic problems provided to road users online can mitigate for example developments of ques in respective areas of a city. In addition, traffic control centers may have to its disposition software running advanced mathematical models of traffic as such, which can improve respective guidance and advice given by the traffic control center. It is important to get reliable forecasts of traffic developments before congestions happens. In the future, it is probable that such traffic control centers can operate without human intervention and in combination with for example self-driven cars, elimination or at least mitigation of the problem with traffic congestion is probable.

In this context, measurement of traffic conditions and traffic development is mandatory to achieve control of traffic flow and achieve reliable traffic forecasts.

The marriage of sensing, analysis, control, and communication offers a promise of realizing a Smart City concept through Intelligent Transportation Systems (ITS). Employing Intelligent Roadside Units (RSUs) may help smooth traffic flow, improve safety and emergency responses, and provide additional services to road users as well as pedestrians. However, a few important factors limit the deployment of physical RSU stations along roads in addition to the complexity of an infrastructure supporting the functionality of the RSU system. Wireless communication as such is well known. However, an RSU station should only communicate with one car at a time passing a RSU station.

U.S. Pat. No. 6,097,313 disclose an information exchange system capable of realizing useful information exchange for a service provider located along a road and road users traveling on the road by effectively using limited communication capacity of a road-vehicle radio communication system. The information exchange system has a vehicle-mounted unit and a roadside unit providing information to the vehicle-mounted unit using a road-vehicle radio communication. The vehicle-mounted unit includes a receiving unit receiving information transmitted from the roadside unit through a radio communication channel and transferring at least a part of the content of the received information to a mad user driving the car.

Limiting the radio range as disclosed above limits the number of cars that can be within radio range of a RSU station, using for example standard WIFI communication as found for example in mobile phones, the range is typical 200 meters as provided by international WIFI standards as known in the art.

A further problem is related to radio beam patterns around a RSU station, should it be an omnidirectional pattern, or for example, a narrow directed beam pattern. A car passing a RSU station should be out of range of the specific RSU station before a next car is within communication range with the same RSU station. This is necessary to avoid information collision for example, which may degrade the information value provided by respective cars. For example, when transmitting two different car velocity measurements more or less at the same time, there might be interference in the common communication channel, and the information value is lost or is degraded. Further, there is normally at least two traffic lanes having traffic moving in different directions. If the RSU reads information from cars moving in both directions, the information value is also degraded.

Another possible problem is that another car, for example a lorry, may block the radio signals between a car and a RSU station. For example, when a road has two traffic lanes in the same direction and two cars are traveling side by side in the same direction, or when parking the lorry in front of an RSU, physical blocking of the radio communication channel is probable.

If standard WIFI technology is applied in a RSU system, it follows from the WIFI standard that a RSU station should be located about 200 meters from adjacent located RSU stations upstream and downstream relative to the traffic flow direction on the side of the road the RSU stations are located.

This implies huge costs of implementing such a WIFI based system due to the large number of physical RSU installations in the RSU system.

Therefore, it is a need for an improved and cheaper RSU station and a system and method thereof.

OBJECT OF THE INVENTION

It is an object of the present invention to provide an alternative to the prior art.

In particular, it may be seen as an object of the present invention to provide Roadside units allocated as a computer coded visual symbol in a computer coded information layer of a computer-coded map alongside roads in the map.

SUMMARY OF THE INVENTION

Thus, the above-described object and several other objects are intended to be obtained in a first aspect of the invention by providing a Roadside unit (RSU) being allocated to a GPS position in a computer coded map section, wherein the RSU is indicated with a computer coded visual symbol at the GPS position, wherein the GPS position is related to a GPS position on the ground along a road, wherein a Roadside server is configured to track movements of cars inside the geographical area defined by the map section, wherein the Roadside server is configured to establish communication with cars detected to be within a first defined distance from the RSU, and to terminate the communication with the detected car when the car has moved a second defined distance away from the RSU.

The present invention is further related to a client system configured to communicate with Roadside units according to the present invention and is implemented in a mobile terminal comprising a computer coded map section, wherein a plurality of computer coded visual symbols representing Roadside units are located along roads in the map section, wherein the client system is configured to compare a distance between the cars position on a road and a RSU encountered alongside the road when driving, and when the distance is equal or less than a defined distance to the encountered RSU, the client system is configured to request communication with the RSU by reading out a communication address of the encountered RSU being embedded in the computer coded visual symbol of the encountered RSU.

Respective aspects of the present invention may each be combined with any of the other aspects. These and other aspects of the invention will be apparent from and elucidated with reference to the embodiments described herein.

The Roadside unit, system and method thereof according to the present invention will now be described in more detail with reference to the accompanying figures. The accompanying figures illustrates an example of embodiment of the present invention and is not to be construed as being limiting to other possible embodiments falling within the scope of the attached claim set.

DETAILED DESCRIPTION OF AN EMBODIMENT

Although the present invention is disclosed in connection with specific examples of embodiments, it should not be construed as being in any way limited to the presented examples. The accompanying claim set defines the scope of protection of the present invention. In the context of the claims, the terms “comprising” or “comprises” do not exclude other possible elements or steps. Further, the mentioning of references such as “a” or “an” etc. should not be construed as excluding a plurality. The use of reference signs in the claims with respect to elements indicated in the figures shall also not be construed as limiting the scope of the invention.

Furthermore, combining individual features mentioned in different claims may possibly be advantageously, and the mentioning of these features in different claims does not exclude that a combination of features is not possible and advantageous.

Figure 1:
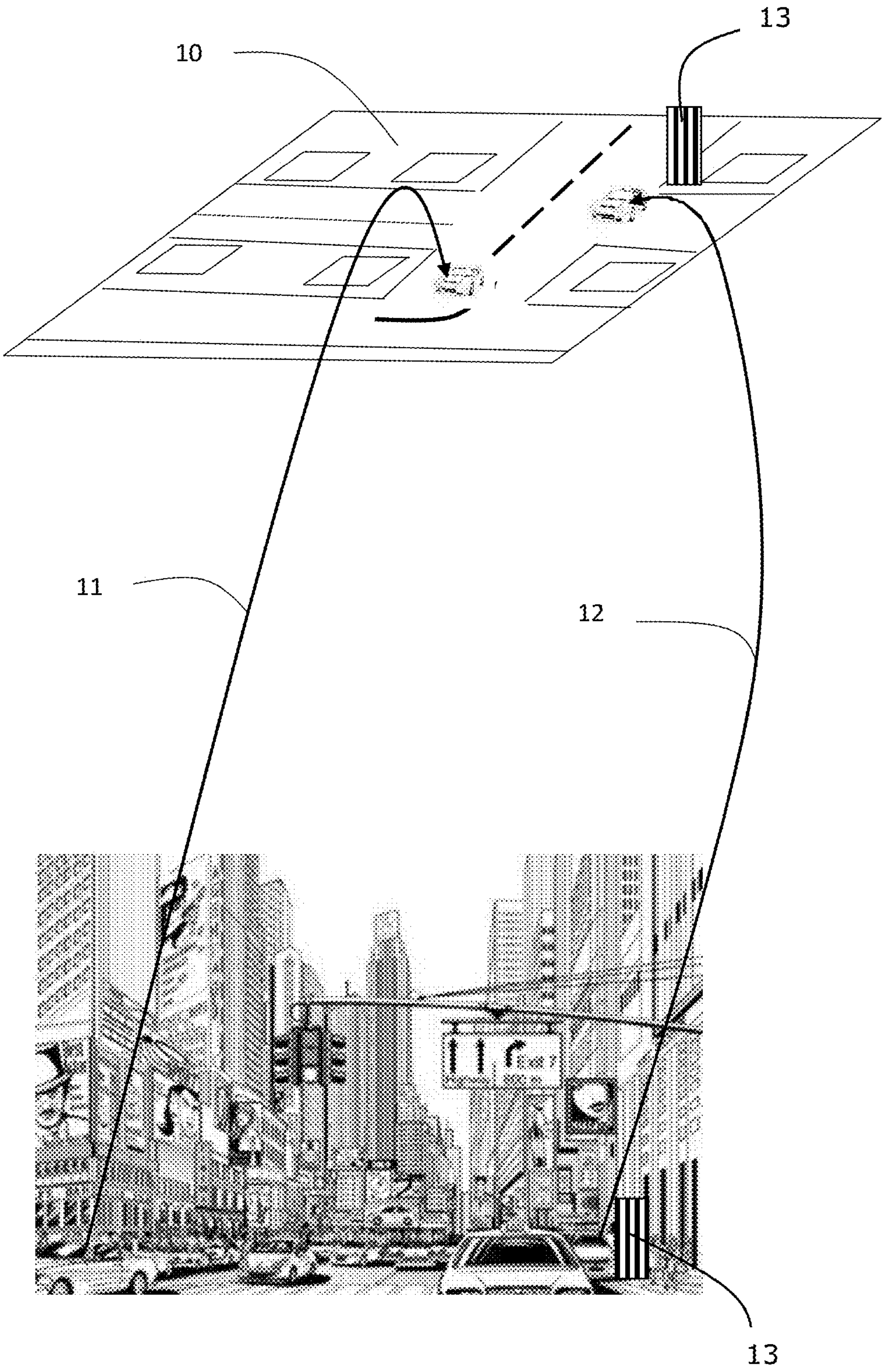
FIG. 1 illustrates an example of embodiment of the present invention.

FIG. 1 illustrates the relationship between moving cars and positions in a map 10. Cars driving on a street can submit their GPS (Global Positioning System) positions to a computer system updating respective GPS positions in a computer coded version of the map 10 (refer FIG. 1). The respective GPS positions 11, 12 can be submitted to the computer system according to different communication protocols. The readout of GPS positions can be done on a regular basis thereby car movements can be tracked and visualized by symbols on roads in the computer-coded version of the map 10.

A roadside unit (RSU) 13 is illustrated located on a side of one of the streets in the illustrated city view in FIG. 1.

The geographical position (GPS position) of the RSU 13 is pre coded into the computer-coded map 10 and can be visualized with a symbol as illustrated in FIG. 1. There is of course multiple RSUs located on the physical ground as well as in the computer coded map 10. Just to simplify the description, FIG. 1 illustrates just one RSU 13.

A goal of a physical RSU system is to be able to read out traffic data from a car to a RSU station close to the car. Therefore, a communication link may exist between the specific car and the specific RSU station. When such a communication is established respective data from the car can be transmitted to a computer system. When virtual RSUs are implemented, the communication is established between the Roadside server and respective clients systems in cars and is qualified by the GPS positions of respective RSUs. A communication address of a specific RSU can be embedded into the computer coded visual symbol representing the specific RSU.

Figure 2:
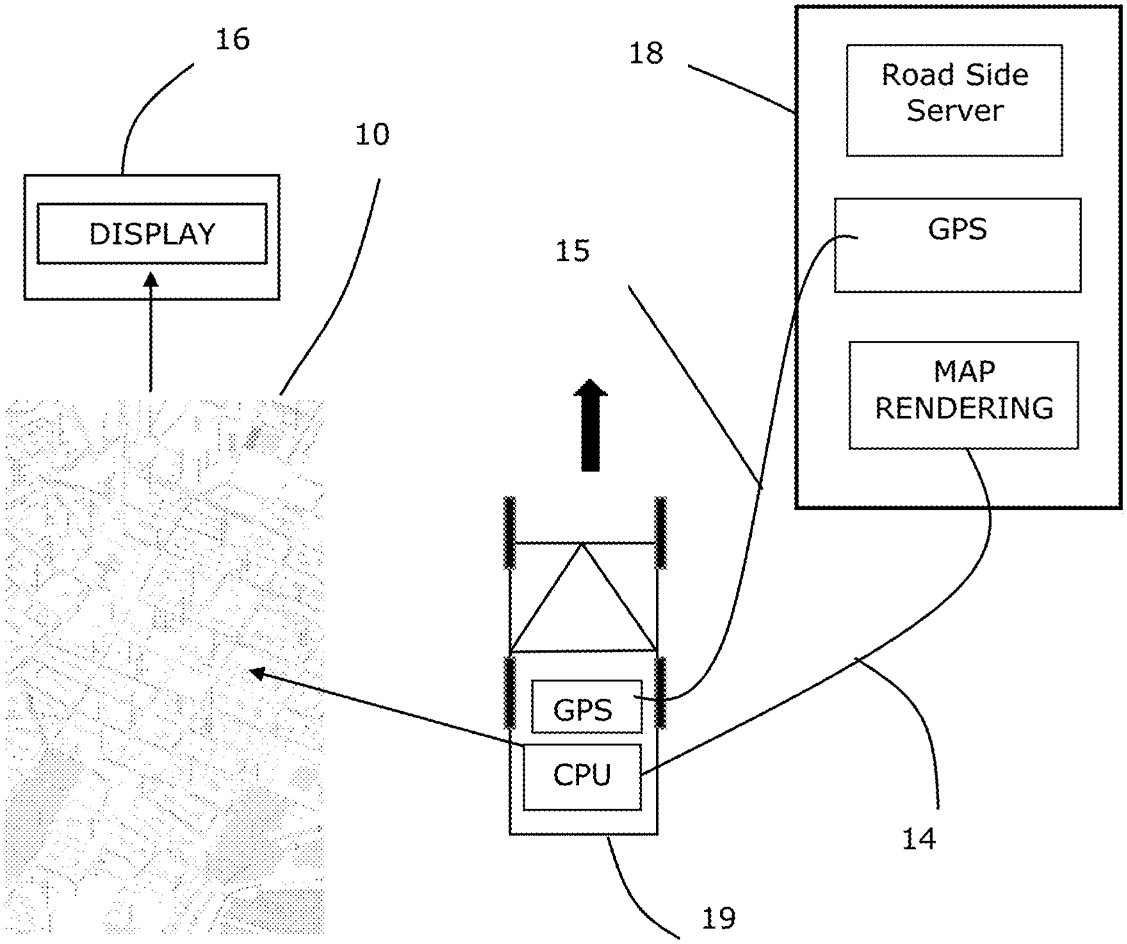
FIG. 2 illustrates further details of the example of embodiment illustrated in FIG. 1.

FIG. 2 discloses further details of an example embodiment of the present invention. A car 19 has a GPS transceiver in communication with a client system CL located inside the car. The client system CL is configured to communicate with a Roadside Server 18. The Roadside server has a library of maps covering large geographical areas. When a car 19 starts using an example of embodiment of the present invention, a first step is downloading a map section 10 from the Roadside server 18 covering a geographical area around the current GPS position of the car 19 when started downloading the map section 10.

When the car 19 receives a copy of the map section 10, the client system CL is configured to display the local copy of the map on a local display 16 inside the car. When the car 19 starts moving, the client system CL samples respective shifting GPS positions plotting them on the local map copy 10 thereby visualizing the movement of the car 19 in the map 10.

Therefore, the client system CL may be configured repeatedly to measure the car’s distance between its own changing GPS positions and respective stationary positions of RSUs.

When a distance to a RSU is below a predefined threshold level, the client system CL contacts the Roadside server 18 and the client system CL is submitting car information to the Roadside server qualified with the GPS position of the virtual RSU the car is passing.

The information submitted can include data related to the car. For example, speed of the car, indication if the window wipers is on, breaks are active etc.

It is also within the scope of the present invention that a communication between a client system CL and a Roadside server 18 can comprise transaction details when for example paying road tolls. Other information elements can be the weight of a lorry passing a RSU. Thereby the Roadside server is capable to verify that a lorry is allowed to travel on the road the lorry is travelling.

A user identity associated with the client system CL can be used to record the roads a driver follows when driving on respective roads inside the map area 10. It is also possible to measure time used between successive RSUs.

In return, the RSU can inform the driver (and the car system if it is an autonomous car for example) about road friction conditions around the RSU, weather information (weather forecasts), etc.

Respective cars can be provided with an identification sent to the Roadside server, which masks the identity of the driver driving the car, i.e. it is not necessary to send the registration number of a car as the identification. Each respective RSU can also be provided with an identity, for example $RSU_i$ wherein the index i is a different number for respective RSUs.

When registering as a user in a Roadside server according to the present invention, personal information like real name, date of birth, private address, driver's license number, etc. may be necessary to submit to the server due to official regulations.

The user identity used in the system need not reflect any of these details, including the registration number of the car.

Any registered user having a bicycle, a motorbike, or is just a pedestrian using his smartphone as a client device CL according to the present invention can register as users. Drivers of motorbikes, bicycles, etc. can stop moving and submit traffic related information at any time to the Roadside server via a WEB page they open in the Roadside server on their smartphone for example. Pedestrians can do the same via their smartphone.

It is within the scope of the present invention that a client system CL, besides updating a local copy of the map 10, may be configured to send GPS positions to the Roadside server 18. Thereby the Roadside server 18 is capable of keeping track of positions of all cars in respective geographical areas, not only within one map section 10, but also in all regular updated map sections residing in the map library of the Roadside server 18.

An alternative is that the Roadside server 18 is configured to read out updated local copies of the map 10 from respective cars 19 from time to time, or at regular intervals. When merging respective local maps 10 into a main map 10, all car positions are available to the roadside server 18 updated at a frequency derived from the period between readouts.

It is also within the scope of the present invention configuring the Roadside server 10 to redistribute merged map sections 10 to respective cars having the same local map section 10, which are located within the area of the map section 10. Thereby the client system CI and the driver receives an update of the real traffic situation around the actual geographical position the car is located.

When a user of the Roadside server is moving outside the boundaries of the map section 10, the client system CL of the user requests a new download of a next map section from the road server. In practice, the first download of the map section 10 may comprise download of a plurality of map sections 10. Thereby shifting a map section 10 is often a seamless operation in the client system.

Besides updating the Roadside server system with car data, a Roadside Unit 13 can inform the user of a passing car about traffic conditions, roadwork etc. A main point of associating a RSU 13 to a geographical position is the ability to provide segmentation of traffic information to the geographical areas wherein the specific information is relevant, i.e., wherein a user is located. A driver will therefore receive in principle only relevant traffic information and guidance related to his present geographical position.

The Roadside server 18 may be configured to attach a version number comprising a unique identification of any message and any version of the same message comprising information that is sent to RSUs within a geographical are. When a client system CL in a car for example receives the message from a first RSU, the client system keeps the version number of the message. When the car approaches a next RSU, the same message can be sent to the CL. If the version number of the message is the same as the previous received message, the client system ignores the message. When the version number is different, the user communicating with the client system receives the updated message, or a new message.

The same argument applies also to the feature of providing respective map sections 10 to for example a car. In this manner, the total geographical area is segmented.

When an updated map section 10 comprising locations of other cars in the neighborhood is downloaded to a specific client system CL, the client system CL of a specific car can be configured to identify any traffic flow directions on roads inside the map section 10. Based on such assessment, a more dominant direction of traffic flow can be identified based on a collective average of movement directions. This will imply that further ahead of the dominant traffic flow direction there will be a high probability of an upcoming traffic congestion. The driver can then decide to drive differently, for example making a detour along directions with less traffic flow.

It is evident from the example discussed above that it is not necessary to use a standard WIFI connection (i.e., a limited radio channel) since the possibility to just communicate with one car at a time now is a question of configuring a software running in the computer to communicate with one car at a time. Therefore, the problem of degraded information content is avoided when using a virtual RSU located in a computer-coded map and by tracking movement of cars in the same map.

The density of physical RSU stations, or virtual RSUs in a map, influence measurement quality. If the traffic density is low, it is evident that speed measurement of a car at one RSU most likely will be the same speed measured in a next RSU located for example 200 meters ahead of the previous RSU. Deployment of physical RSU stations require a density accounting for worst scenario situations. This situation can be compared to the density of sampling points that is necessary to have when digitizing an analogue signal to a digital representation.

According to an aspect of the present invention, the number of virtual RSUs in a map is changeable, for example, dependent on a specific traffic condition.

Figure 3:
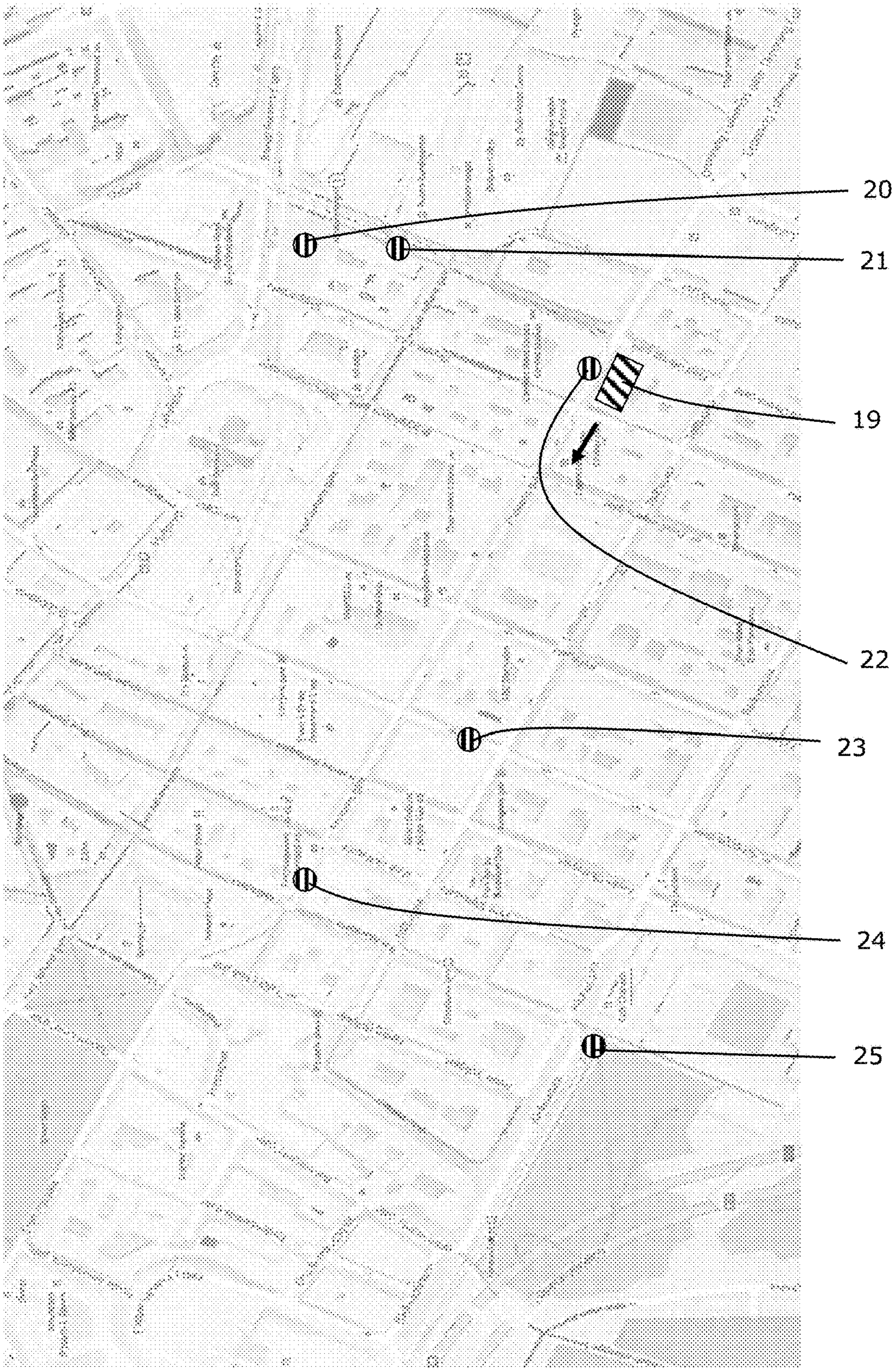
FIG. 3 illustrates further details of the example of embodiment illustrated in FIG. 1.

FIG. 3 illustrates some virtual RSUs 20, 21, 22, 23, 24 being deployed in a map section 10. The distance between respective RSUs can be uneven considering for example only historical data related to traffic conditions. If historical data indicates that a specific road has less traffic, it is not necessary to have many RSUs along this road. If the historical data indicates that between specific hours of the day the traffic is high, a Roadside server according to the present invention can be configured to increase the number of RSUs during these hours.

Figure 4:
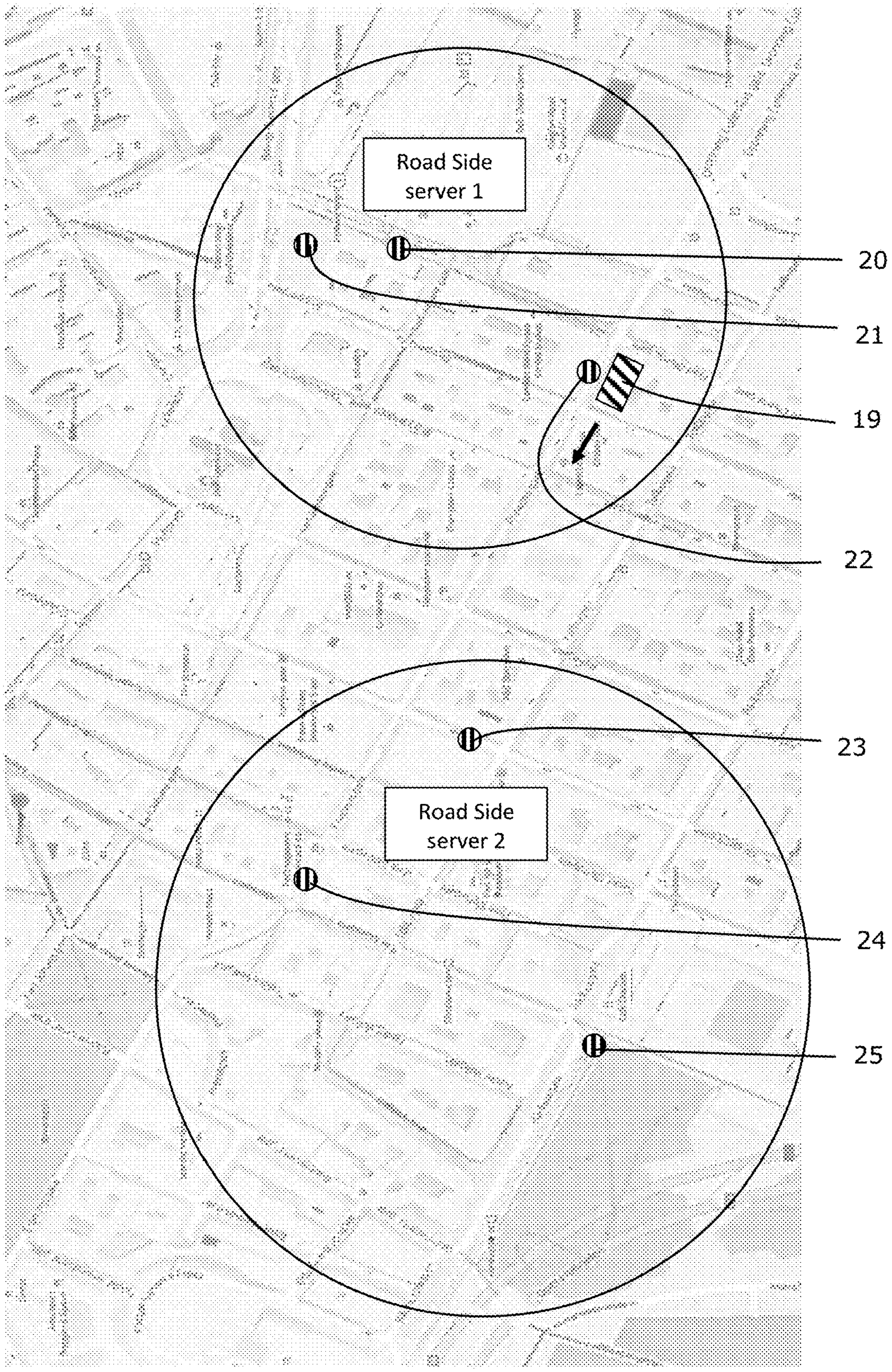
FIG. 4 illustrates further details of the example of embodiment illustrated in FIG. 1.

FIG. 4 illustrates another method of providing segmentation of maps and virtual RSUs. A plurality of Roadside servers are allocated to respective specific different geographical areas. In FIG. 4, a first Roadside server 1 covers a first geographical area while a second Roadside server 2 covers a second geographical area.

When a map section 10 is downloaded comprising indications of several Roadside servers, a symbol, for example a circle, is used to indicate the geographical area a specific Roadside server is serving. In FIG. 4, a circle around Roadside server 1 limits the geographical area of Roadside server 1. A similar circle around Roadside server 2 indicates the geographical area of the Roadside server 2.

Inside the area of Roadside server 1, there is a car 19 moving in the direction of the arrow. After a while, the car will pass the boundary of the geographical area of Roadside server 1. An information layer of the downloaded map may comprise different data related to the Roadside server 1 and the Roadside server 2. For example, the radius of the circle of the area served by the Roadside server 1. In addition, the GPS position of the center of the circle is also available. Therefore, the client system CL is configured to track how far from the center of the circle the car is located at any time. When the car is crossing the circle line, the CL system knows that the car is outside the service area of the Roadside server 1. The CL system is then configured to contact the Roadside server 2. The address of Roadside server 2, or any Roadside server, can be part of an information layer downloaded with the map section 10. User profiles, user names, and other user-defined data can be submitted between different Roadside servers as needed.

The geographical segmentation of both location of virtual RSUs as well as geographical area segmentation by introducing several Roadside servers simplifies the administration of collected car data as well as identifying cars that need specific information related to their present location in the map section 10. When a car is within the defined communication distance to a RSU 13, the Roadside server is notified that this car is now in a GPS position relevant to some specific traffic information, for example information about a traffic incident. The car is then receiving the information qualified by the GPS position of the virtual RSU the car is in communication with.

Communication between virtual RSUs and the Roadside servers is between respective client systems CL and the Roadside server serving the geographical area the client system CL is located. An aspect of the present invention is to use WEB as a system providing interchange of data, information, etc. between registered users and Roadside servers. Web sockets or HTTP/2 protocols can be used to implement this kind of communication. By utilizing information, layers in maps being downloaded from a Roadside server to a client system CL, or from a client system to a Roadside server, any information related to geographical positions can be marked at corresponding GPS positions in the information layer simplifying the retrieval of position sensitive information. Accidents or fires can for example be visually illustrated in an information layer at the respective GPS positions, and when an updated map section 10 covering the area of a fire for example is downloaded to cars inside the covered area of the map section 10, they are immediately informed about the fire.

Another aspect of the RSU system according to the present invention is that two or more drivers can easily contact each other sharing traffic information. With reference to FIG. 3, the GPS positions of cars inside the area of map section 10 are available to all cars when the map section is downloaded to all cars. When a car is driving towards virtual RSU 23, the driver decides that he is interested to learn more about the traffic situation around the virtual RSU 24. He can then post a message to a next car passing the RSU 24 by submitting the message via RSU 23 to the Roadside server 18 that is waiting for a next car to come in communication with the server at RSU 24. Then any driver can receive up to date traffic information almost directly from drivers located in the area of interest. If an approaching car towards the RSU 24 is not responding to the message requesting information, the Roadside server 18 can be configured to repeat the message a specified number of times, but restricted to a defined time limit that reflects the time span wherein this information can be of interest for the requesting driver.

A method according to the present invention providing collecting and distribution of information related to traffic conditions is provided for by configuring a roadside server serving a specific defined geographical area. Several roadside servers can cooperate thereby serving larger connected areas. Each car using the method according to the present invention is configured with a client system arranged to be able to communicate with a roadside server serving the geographical area a respective car is driving.

The roadside server has a computer coded map wherein symbols representing a roadside unit (RSU) is allocated at defined GPS positions. A driver using a car configured with a client system according to the present invention can request a downloading of a computer coded map of the area the car is driving. The client system is further adapted to track its own movement by registering the GPS positions of the car when driving on a road. The client system is then capable of identifying when the car is approaching a GPS position of a specific symbol representing an RSU as well as identifying if a car has passed the GPS position of the specific symbol in the map representing the RSU. For example, if the car is within a specified first distance from the GPS position of the specific symbol the client system can signal the client server that the car is within this pre-defined distance from the symbol representing an RSU and the client system establishes a communication channel with the roadside server. When the GPS position of the moving car is detected to be a second defined distance away from the GPS position of the specific symbol the client system can terminate the communication with the client server.

As long as the car is positioned between the first and second distance from the GPS position of the specific symbol, the client system of the car is configured to act as an RSU, i.e., the client system is configured to execute a functionality representing an RSU. In this manner, there is no need to install a physical RSU beside the road since the client system approaching the GPS position of the symbol representing the RSU can function as the RSU, for example sending car related data like speed of the car, active brakes, etc. In this manner the RSUs allocated along the side of roads are non-existing devices and can therefore be denoted as virtual RSUs as used in the disclosure of the invention above and the configured functionality of an RSU running in a client system is transported by the car from one GPS position to a next GPS position repeating the functionality of the RSU. In a sense, the present invention is a mobile RSU.

A further aspect of the present invention is therefore that adding further RSU devices along roads is merely to add further symbols in a computer coded map at defined GPS positions.

Therefore, the cost of a RSU network along sides of roads are dramatically reduced compared to the traditional solutions of allocating physical RSUs along roads.

According to an example embodiment of the present invention a method of collecting and distributing information related to traffic conditions along respective roads located within a defined geographical area, comprises steps of:

- allocating respective symbols in a computer coded map of the defined geographical area along roadsides of respective roads within the defined geographical area at respective selected geographical positions identifiable by their associated Global Positioning System (GPS) positions,
- wherein the computer coded map resides in a roadside server allocated to serve the defined geographical area,
- wherein the computer coded map of the defined geographical area is downloaded on request from drivers of cars within the defined geographical area to respective client systems arranged in respective cars,
- wherein a respective client system residing in a car is configured to update repeatedly a GPS position of the moving car and the client system is further configured to compare the GPS position of the car with a GPS position of a symbol on a roadside of the road the car is driving on and which the car is approaching,
- wherein when the client system identifies that the GPS position of the moving car is within a first distance from the GPS position of the symbol the car is approaching the client system is configured to establish wireless communication with the roadside server,
- wherein when the client system identifies that the GPS position of the moving car is away a second distance from the GPS position of the symbol the moving car has approached, the client system is configured to terminate the communication with the roadside server.

According to the example of embodiment disclosed above, wherein respective symbols allocated to the respective GPS positions in the computer coded map of the defined map represents a Roadside Unit (RSU), wherein a defined functionality of a respective RSU is defined by configured operations of the client system of the car being activated when a moving car is within the first distance from the GPS position of the symbol the car is approaching, wherein the configured operation is terminated when the GPS position of the car is passing the symbol the car has approached and is outside the defined second distance from the symbol.

According to the example of embodiment disclosed above, wherein the configured operations of a client system of a car comprises sending car related data comprising information related at least to current speed of the car, an indication if window whippers are active, and an indication if the brake of the car is activated.

According to the example embodiment disclosed above, wherein the configured operations of a client system comprise sending an updated version of the computer coded map of the defined geographical area comprising respective GPS positions of the car plotted in the computer coded map.

According to the example embodiment disclosed above, wherein a respective client system of a car receives updated versions of the computer coded map from at least one other car enabling the client system of the car receiving the updated version of the computer coded map to estimate traffic density in areas around the position of the car receiving the updated computer coded map.

According to the example embodiment disclosed above, wherein when a client system of a car has established communication with the roadside server, the roadside server is configured to send further traffic related information to the client system which can be visualized on a computer screen connected to the client system.

According to the example embodiment disclosed above, wherein the computer screen comprises a touch sensitive surface enabling a driver of a car to select a GPS position of another car thereby the client system of the car is configured to send a message via the road side server configured to track the GPS positions of the selected car and when the selected car is within the first distance from a GPS position of a symbol in the copy of the computer coded map downloaded to the selected car, the roadside server sends the message to the selected car.

A system comprising at least one client system arranged in at least one car and a roadside server arranged to execute the method disclosed above.

According to the system disclosed above, wherein the client system is configured to perform a defined set of functions corresponding to functions of a roadside unit.

According to the system disclosed above, wherein the at least one client system arranged in the at least one car sends GPS positions of the car to the roadside server.

According to the system disclosed above, wherein the roadside server is configured to perform traffic density assessment inside a geographical area covered by the roadside server.

According to the system disclosed above, wherein the roadside server is configured to communicate traffic density assessment related to respective GPS positions of symbols allocated in the computer coded map whenever a client system communicates with the roadside server when a car is passing a respective GPS position of the respective symbols allocated in the computer coded map.

According to the system disclosed above, wherein a client system is implemented in a mobile device allocatable to a specific car.

According to the system disclosed above, wherein the roadside server is configured to send traffic guidance regarding roads with less traffic than other roads.

A further aspect of the present invention is to use a mixture of physical and virtual Roadside units inside road tunnels. Whenever there is an accident or fire, respective physical and virtual Roadside units can communicate over an emergency network configured inside the tunnel. If the communication is lost due to fire, any physically surviving Roadside units can be accessed by approaching the emergency team, for example over a WIFI connection, and the last available collected car data is available to help the emergency team understand the situation.

The invention claimed is:

1. A method of collecting and distributing information related to traffic conditions along respective roads located within a defined geographical area, without requiring physical roadside unit infrastructure, the method comprising steps of:

- allocating respective symbols in a computer coded map, wherein the respective symbols represent virtual Roadside Units (RSUs) that are non-physical devices, of the defined geographical area along roadsides of respective roads within the defined geographical area at respective selected geographical positions identifiable by their associated Global Positioning System (GPS) positions, wherein the computer coded map resides in a roadside server allocated to serve the defined geographical area, wherein the computer coded map of the defined geographical area is downloaded on request from drivers of cars within the defined geographical area to respective client systems arranged in respective cars, wherein a respective client system residing in a car is configured to update repeatedly a GPS position of the moving car and the client system is further configured to compare the GPS position of the car with a GPS position of a symbol on a roadside of the road the car is driving on and which the car is approaching, wherein when the client system identifies that the GPS position of the moving car is within a first distance from the GPS position of the symbol the car is approaching the client system is configured to establish wireless communication with the roadside server via a wide-area network, wherein the client system is configured to execute functionality corresponding to a physical Roadside Unit while within the first distance from the GPS position of the symbol, wherein when the client system identifies that the GPS position of the moving car is away a second distance from the GPS position of the symbol the moving car has approached, the client system is configured to terminate the communication with the roadside server, wherein the functionality corresponding to the physical Roadside Unit is terminated.

2. The method of claim 1, wherein respective symbols allocated to the respective GPS positions in the computer coded map of the defined map represents a Roadside Unit (RSU), wherein a defined functionality of a respective RSU is defined by configured operations of the client system of the car being activated when a moving car is within the first distance from the GPS position of the symbol the car is approaching, wherein the configured operation is terminated when the GPS position of the car is passing the symbol the car has approached and is outside the defined second distance from the symbol.

3. The method of claim 2, wherein the configured operations of a client system of a car comprises sending car related data comprising information related at least to current speed of the car, an indication if window wipers are active, and an indication if the brake of the car is activated.

4. The method of claim 3, wherein the configured operations of a client system comprise sending an updated version of the computer coded map of the defined geographical area comprising respective GPS positions of the car plotted in the computer coded map.

5. The method of claim 4, wherein a respective client system of a car receives updated versions of the computer coded map from at least one other car enabling the client system of the car receiving the updated version of the computer coded map to estimate traffic density in areas around the position of the car receiving the updated computer coded map.

6. The method of claim 1, wherein when a client system of a car has established communication with the roadside server, the roadside server is configured to send further traffic related information to the client system which can be visualized on a computer screen connected to the client system.

7. The method of claim 6, wherein the computer screen comprises a touch sensitive surface enabling a driver of a car to select a GPS position of another car thereby the client system of the car is configured to send a message via the road side server configured to track the GPS positions of the selected car and when the selected car is within the first distance from a GPS position of a symbol in the copy of the computer coded map downloaded to the selected car, the roadside server sends the message to the selected car.

8. The method of claim 2, wherein adding or removing a RSU is equivalent to adding a symbol at a given GPS position or removing a symbol from the computer coded map.

9. A system comprising at least one client system arranged in at least one car and a roadside server arranged to execute a method according to claim 1.

10. The system of claim 9, wherein the client system is configured to perform a defined set of functions corresponding to functions of a roadside unit.

11. The system of claim 9, wherein the at least one client system arranged in the at least one car sends GPS positions of the car to the roadside server.

12. The system of claim 11, wherein the roadside server is configured to perform traffic density assessment inside a geographical area covered by the roadside server.

13. The system of claim 12, wherein the roadside server is configured to communicate traffic density assessment related to respective GPS positions of symbols allocated in the computer coded map whenever a client system communicates with the roadside server when a car is passing a respective GPS position of the respective symbols allocated in the computer coded map.

14. The system of claim 9, wherein a client system is implemented in a mobile device allocatable to a specific car.

15. The system of claim 13, wherein the roadside server is configured to send traffic guidance regarding roads with less traffic density than other roads.

* * * * *